United States Patent [19] [11] 4,309,368
Groves [45] Jan. 5, 1982

[54] ELECTROSTATIC PINNING OF EXTRUDED THERMOPLASTIC FILM

[75] Inventor: David J. Groves, Welwyn Garden City, England

[73] Assignee: Imperial Chemical Industries Limited, London, England

[21] Appl. No.: 168,416

[22] Filed: Jul. 10, 1980

Related U.S. Application Data

[63] Continuation-in-part of Ser. No. 102,351, Dec. 11, 1979, abandoned.

[30] Foreign Application Priority Data

Aug. 1, 1979 [GB] United Kingdom ............... 26812/79

[51] Int. Cl.³ .......................... B29D 7/02; H05B 7/06
[52] U.S. Cl. ................................. 264/22; 425/174.8 E
[58] Field of Search .................................. 264/22, 39; 425/174.8 E; 226/94; 361/234

[56] References Cited

U.S. PATENT DOCUMENTS

Re. 27,771 10/1973 Owens et al. .................... 264/22
3,039,388 6/1962 Brandt et al. .................... 226/94
3,223,757 12/1965 Owens et al. .................... 264/22
3,571,853 3/1971 Denton .......................... 425/174.8 E
3,686,374 8/1972 Hawkins ........................ 264/22
3,758,251 9/1973 Gillyns et al. .................. 264/22
3,883,279 5/1975 Heyer ........................... 425/174.8 E
3,904,725 9/1975 Husky et al. .................... 264/22
4,203,144 5/1980 Okamoto ........................ 361/234

FOREIGN PATENT DOCUMENTS 2456066 11/1974 Fed. Rep. of Germany .
2902639 1/1978 Fed. Rep. of Germany .
2252207 6/1975 France .
1409218 10/1975 United Kingdom .
1446596 8/1976 United Kingdom .
1463671 2/1977 United Kingdom ................. 264/22
1469983 4/1977 United Kingdom .

Primary Examiner—James B. Lowe
Attorney, Agent, or Firm—Cushman, Darby & Cushman

[57] ABSTRACT

Apparatus and process for the extrusion and quenching of thermoplastics films wherein the film is electrostatically pinned to a cooled quenching surface by means of a blade electrode having a charge-emitting edge which is non-linear and conforms substantially to the transverse curvature in the edge portions of the film.

14 Claims, 8 Drawing Figures

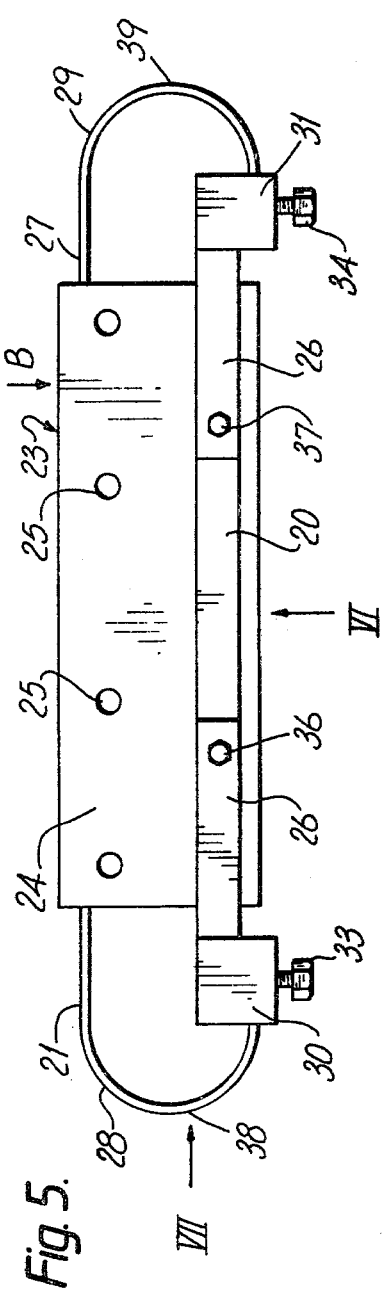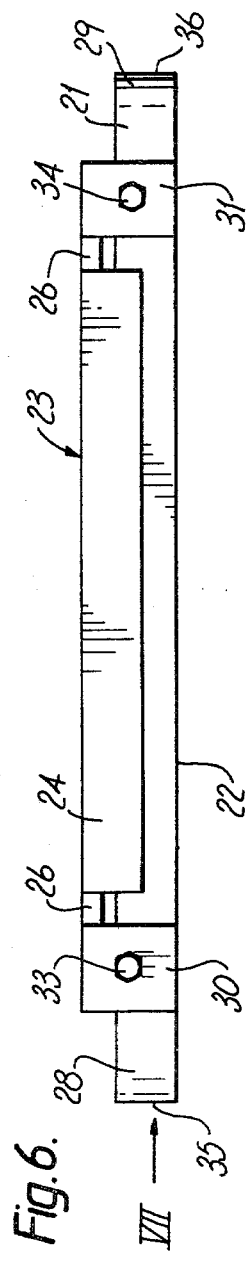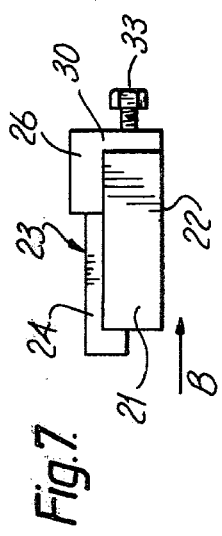

ELECTROSTATIC PINNING OF EXTRUDED THERMOPLASTIC FILM

This application is a continuation-in-part of my U.S. Ser. No. 102,351 filed Dec. 11, 1979 now abandoned.

The present invention relates to a process and apparatus for extruding and quenching molten thermoplastics films.

One known method for the production of thermoplastics films is by extrusion in the molten state from a slot die onto a rotating cooled casting drum where the film is quenched and solidified into a form suitable for subsequent film-making operations. In the case of certain crystallisable thermoplastics, such as polyethylene terephthalate, an excessive degree of crystallinity causes embrittlement and would interfere with subsequent film-making operations. It is therefore important to rapidly quench such thermoplastics films to the amorphous state in order to minimise the degree of crystallinity in the quenched film. One method of achieving such quenching is to ensure that intimate contact is established between the film and the casting drum surface by depositing electrostatic charges upon the molten film before it reaches the casting drum and usually electrically earthing the casting drum. Such a method is often termed in the art "electrostatic pinning". U.S. Pat. No. 3,223,757 describes a process and apparatus for electrostatic pinning wherein the electrode for depositing the electrostatic charges may comprise a fine wire, a knife edge or a set of needle probes.

Although electrostatic pinning has been recognised as a useful operation in the production of polyethylene terephthalate films, it has been found that bubbles tend to become entrapped between the film and the casting drum surface with the result that thermal contact between the film and the casting drum surface is impaired thereby reducing the casting efficiency. The entrapped bubbles also tend to cause irregularities in the surface of the quenched film. These defects become more prominent with increasing casting speeds.

It has also been observed that the edge portions of the molten thermoplastics film tend to curl in a transverse direction in relation to the film, the amount of curl being more pronounced with increasing casting speeds. This effect is believed to arise because the edges of the molten film are subjected to transverse melt tension forces directed towards the central portions of the film. As a consequence, the edge portions of the film tend to neck-in towards the central portion together with a corresponding increase in the thickness of the film, the latter resulting in an increase in the melt tension and a longer melt path in the edge portions before touch-down. As a result, the curled edge portions of the film are deposited upon the casting drum surface later than the central portion. Consequently, it is not possible to locate a conventional electrostatic pinning electrode in the form of a fine wire supported in tension and hence in a straight line, as described and illustrated in U.S. Pat. No. 3,233,757, so as to provide an optimum pinning effect at all positions across the width of the film, since the pinning force exerted by the electrostatic charges deposited upon the film is determined by the distance between the electrode and the film. For example, if such a wire electrode were spaced in relation to the central portion of the film to provide optimum pinning of those portions, the wire would be unacceptably close to the edge portions of the film and too far from the region of first contact of the film with the casting surface with the consequence that discharges may occur between the wire and the edge portions of the film and between the film and the casting surface thereby interrupting the deposition of charges and hence the continuity of the pinning operation and resulting in the entrainment of air bubbles between the molten film and the casting surface. It is therefore necessary to locate a wire electrode at a sufficient distance from the curled edges of the film to avoid these defects but such a spacing may be greater than the spacing required to produce optimum pinning of the central portion with the consequence that air bubbles may become entrapped between the film and the casting drum surface.

It will be appreciated therefore that pinning by means of a tensioned wire electrode generally involves compromise conditions which may vary considerably from the optimum conditions required at most positions across the width of the film.

According to the present invention, a process for extruding and quenching a thermoplastics film comprises continuously extruding a molten thermoplastics film onto a moving casting surface, depositing electrostatic charges upon the molten film by means of an electrostatic pinning electrode supported transversely across and in spaced relation to the molten film in the proximity of or prior to the region of first contact of the film with the casting surface, said electrostatic pinning electrode comprising a blade having a charge-emitting edge, which is non-linear and conforms substantially at least to the transverse curvature of the edge portions of the film.

The invention also relates to an apparatus for extruding and quenching a thermoplastics film, which comprises a movable casting surface arranged to receive a web of continuously-extruded thermoplastics film, an electrostatic pinning electrode supported transversely across and in spaced relation to the path of the molten film in the proximity of or prior to the region of first contact of the film with the casting surface, said electrostatic pinning electrode comprising a blade having a charge-emitting edge which is non-linear and conforms substantially at least to the transverse curvature of the edge portions of the film during extrusion and quenching.

By maintaining the charge-emitting edge of the electrode in a curved state in accordance with the invention whereby the charge-emitting edge conforms substantially at least to the transverse curvature of the edge portions of the film, i.e. the transverse cross-section (disregarding the film thickness) of the edge portions of the film, it is possible to ensure that optimum pinning conditions are applied to the edge portions of the film.

It is preferred that the charge-emitting edge of the electrode should conform substantially to the transverse cross-section of the film across the whole width of the film.

Generally, in a continuous process for extruding and quenching a thermoplastics film, the transverse cross-section of the central portion of the film is substantially rectilinear. Accordingly in a preferred embodiment of the invention, the section of the charge-emitting edge of the electrode which deposits electrostatic charges upon the central rectilinear portion of the molten film is substantially linear and conforms substantially to the rectilinear transverse cross-section of the central portion of the film.

It will be appreciated that it is not essential for the charge-emitting edge of the electrode to correspond exactly to the cross-section of the film. In contradistinction to the pattern of electrostatic charges deposited upon a film by means of a conventional straight wire electrode supported in tension which is characterised by two continuously fluctuating and unstable boundaries, the charges deposited by the blade electrode according to the invention are located within stable non-fluctuating transverse boundaries. Accordingly, the results of the invention are achieved provided the charge-emitting edge of the blade electrode is so located with respect to the curved edge portions of the film that the edge portions are within the region of charge emission defined by the stable non-fluctuating charge boundaries. Preferably, the whole width of the extruded film falls inside the region of stable non-fluctuating charge boundaries. In order that effective pinning forces are established between the molten film and the casting surface it is preferred that sufficient force-generating electrostatic charges are deposited upon the film prior to first contact with the casting surface. This may be achieved by locating the charge-emitting edge of the electrode such that a major proportion of the region of charge emission defined by the stable non-fluctuating charge boundaries is located prior to the first contact of the film with the casting surface.

According to a preferred embodiment of the invention, which is especially suitable for the extrusion and quenching of the preferred film according to the invention, namely polyethylene terephthalate, the distance between the charge-emitting edge of the electrode and the film (measured along the shortest path between the film and the edge) at any chosen position along the charge-emitting edge should not exceed 125% and preferably should not exceed 110% of the distance between the film and the charge-emitting edge at the position along the edge which is closest to the film. Typically, in the casting of a polyethylene terephthalate film, the charge-emitting edge of the electrode which deposits electrostatic charges upon the central rectilinear portion of the molten film is spaced no more than 8 mm from the film (measured along the shortest path between the film and the edge) and not less than 2 mm at the closest spacing between the edge and the film. Preferably the spacing is 4 to 5 mm at all positions across the width of the film.

It will be understood that whilst it is possible to apply optimum pinning conditions to substantially the complete width of the film, including the edge portions, it may be impossible to apply electrostatic charges immediately in the vicinity of the film edges without a risk of a discharge to the casting surface and consequent interruption of the pinning effect. Consequently, it is envisaged according to the invention that electrostatic charges need not be applied right to the edges of the molten film. Alternatively, it is possible to apply electrostatic charges almost to the edges of the film if the distance between the charge-emitting edge of the blade electrode and the film (measured along the shortest path between the film and the edge) is progressively increased towards and in the vicinity of the edges of the film thereby diminishing the electrostatic field towards the edges of the film, and hence the risk of a discharge between the charge-emitting edge and the casting surface is reduced. The pinning force is however also diminished outwardly towards the edges of the film with such an electrode arrangement.

The present invention may be used for the quenching of any thermoplastics material which is capable of being formed into a flat self-supporting film by continuous extrusion and quenching, e.g. polystyrene, polyamides, polymers and copolymers of vinyl chloride, polycarbonate, polymers and copolymers of olefines such as polypropylene, and polyesters of dibasic aromatic carboxylic acids with divalent alcohols. Polyester films which may be quenched according to this invention may be produced by condensing one or more dicarboxylic acids or their lower alkyl diesters, e.g. terephthalic acid, isophthalic acid, phthalic acid, 2,5-, 2,6- and 2,7-naphthalene dicarboxylic acid, succinic acid, sebacic acid, adipic acid, azelaic acid, diphenyl dicarboxylic acid, and hexahydroterephthalic acid, or bis-p-carboxyl phenoxy ethane, optionally with a monocarboxylic acid, such as pivalic acid, with one or more alkylene glycols, e.g. ethylene glycol, 1,3-propanediol, 1,4-butanediol, neopentyl glycol and 1,4-cyclohexane-dimethanol. The invention is particularly suitable for the quenching of molten polyethylene terephthalate films. The films quenched according to this invention may contain conventional additives such as particulate fillers added, for example, for slip or surface matting properties, anti-static agents, dyes and pigments. The invention is also suitable for the quenching of composite films comprising two or more thermoplastics layers.

The invention is particularly effective for the quenching of polyethylene terephthalate films on casting surfaces moving at a linear speed in the range 20 to 400 m per minute. The present invention is especially effective in providing satisfactory pinning conditions at the faster casting speeds, e.g. exceeding 50 m per minute, which tend to cause excessive edge curvature in the film but also provides benefits such as pinning stability and ease of maintaining stable pinning conditions at casting speeds of 50 m per minute or less. The invention is particularly effective for the quenching of polyethylene terephthalate films at casting speeds up to 250 m per minute and preferably up to 175 m per minute.

The moving casting surface may be a moving metal band or a rotating cylindrical metal drum, the latter being preferred. The casting surface may be cooled to the appropriate quenching temperature by means of cooling fluids. In the case of a casting drum, the cooling fluid, e.g. water, may be circulated internally through the drum.

The casting surface may be highly polished, i.e. having a surface mattness represented by a Centre Line Average (measured by British Standard 1134:1972) of less than 0.025 μm, to provide films having excellent surface quality. Rougher casting surfaces, e.g. having a Centre Line average up to 5 μm, are effective in providing channels for the escape of any air bubbles which may become entrapped between the molten film and the casting surface. Nevertheless, rougher casting surfaces tend to emboss the cast film and may need to be avoided when surface quality is important. Casting surfaces having a surface mattness represented by a Centre Line Average in the range 0.1 to 0.5 μm provide a reasonable compromise between surface quality and casting conditions.

Preferably, the electrostatic pinning electrode is located so that the electrostatic charges are deposited on the side of the molten film other than the side which comes into contact with the casting surface.

The blade electrode preferably has a charge-emitting edge having a width up to 500 μm and most preferably up to 250 μm. Narrow blade edges having a width in the range 25 to 100 μm provide a more intense electrostatic field at the charge-emitting edge and hence more effective charge emission.

The conditions employed for electrostatic pinning may be those conventionally employed, e.g. as described in U.S. Pat. No. 3,223,757. Thus, a high electrical potential may be maintained between the casting surface and the pinning electrode. In one preferred embodiment, the pinning electrode is connected to a direct current voltage supply and the casting surface is electrically earthed. A suitable direct current supply provides a voltage in the range 2 to 30 kilovolts and a current of 0.3 to 50 milliamperes. A typical supply comprises a voltage in the range 5 to 12 kilovolts and a current in the range 1 to 20 milliamperes.

Alternatively, the pinning electrode may be connected to an alternating supply, as disclosed in British Pat. No. 1 446 596, comprising a voltage of symmetrical or asymmetrical waveform exceeding 4.0 kilovolts peak to peak and having a frequency not exceeding that at which positive and negative electrostatic charges emitted by the electrode are unable to cross the space between the electrode and the molten film before the polarity of the voltage on the electrode changes.

If desired the process and apparatus of the invention may also include means for applying suction between the molten film and the casting surface as described in British Pat. No. 1 469 983.

The blade electrode used in the process and apparatus according to the invention may be mounted upon a carrier suitably insulated to prevent discharge between itself and the electrode and/or the casting surface. The blade, which preferably comprises non-corrosive steel or phosphor bronze, may be formed from a strip having substantially linear parallel edges and maintained in the desired configuration by the carrier. The configuration of the charge-emitting edge may be imposed upon the blade electrode by clamping the blade with one or more clamps.

In another preferred embodiment of the invention, the end sections of the blade electrode do not extend beyond the film edges but are curved in the vicinity of the film edges and towards the central portion of the film thereby avoiding any risk of discharge between the electrode and the casting surface beyond the film edges and hence the need for the provision of insulating means such as those used with conventional wire electrodes, e.g. as described in U.S. Pat. No. 3,571,853.

The cast films produced according to this invention may be subjected to any additional film-forming operations which are known in the art, such as stretching in one or more directions to effect molecular orientation followed optionally by heat setting. Such operations are disclosed for polyethylene terephthalate films in British Pat. No. 838 708.

The invention is now further described with reference to the accompanying drawings, in which:

FIG. 5 is a plan view of a preferred form of electrode assembly suitable for use in the apparatus illustrated in FIGS. 1 to 4;

FIG. 6 is a side elevational view of the assembly illustrated in FIG. 5 viewed in the direction of arrow VI in FIG. 5;

FIG. 7 is an end elevational view of the assembly illustrated in FIGS. 5 and 6 viewed in the direction of the arrow VII in FIGS. 5 and 6.

Figure 1:
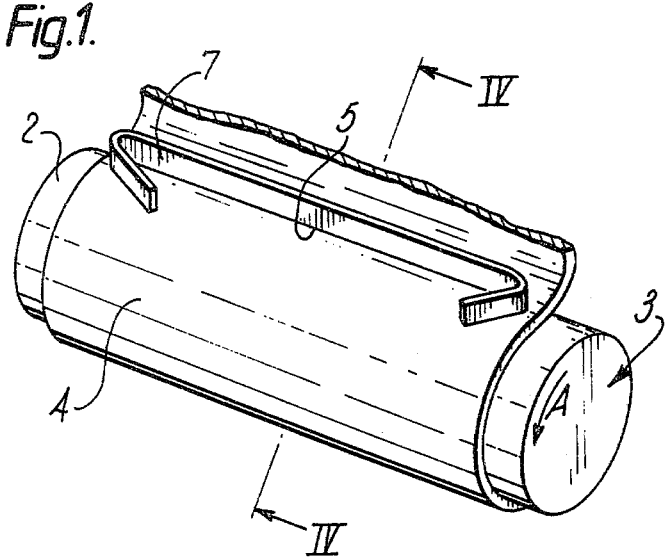
FIG. 1 is an isometric view of an apparatus according to a preferred embodiment of the invention.

The apparatus illustrated in FIGS. 1 to 4 is suitable for the casting and quenching of molten polyester thermoplastics polyester films such as polyethylene terephthalate films, in relation to which the apparatus is described. The molten polyethylene terephthalate film 4 is extruded in a conventional manner through a straight film-forming slot die (not illustrated in the drawings) onto a polished casting surface 2 of a water-cooled steel casting drum 3 which is electrically earthed. The polished casting surface 2 has a Centre Line Average (measured by British Standard 1134:1972) of less than 0.025 μm. In operation, the casting drum 3 is rotated in the direction of the arrow A at a peripheral speed in the range 20 to 200 m per minute so that the molten film 4 is laid continuously upon the casting surface 2. After quenching, the film is stripped from the casting surface 2 and passed to a further film-making operation (not illustrated).

An electrostatic pinning blade electrode 7 extends transversely across the molten film and is supported out of contact with the film in the proximity of the region of first contact of the film with the casting surface 2. The blade electrode 7 is supported and clamped to a suitable carrier such as that described with reference to and illustrated in FIGS. 5 to 7. For simplicity of illustration, the carrier is not shown in FIGS. 1 to 4 nor the framework to which the carrier is attached. The blade electrode 7 comprises a strip of non-corrosive steel approximately 1.25 cm wide and of uniform thickness 75 μm or 38 μm and has a charge-emitting edge 5 located downwardly towards the film.

The blade electrode 7 is maintained at a high electrical potential with respect to the casting drum 3 by connection to a direct current voltage supply (not shown in the drawings) which has a voltage output in the range 5 to 10 kilovolts at a current in the range 0.3 to 10 milliamperes.

Figure 2:
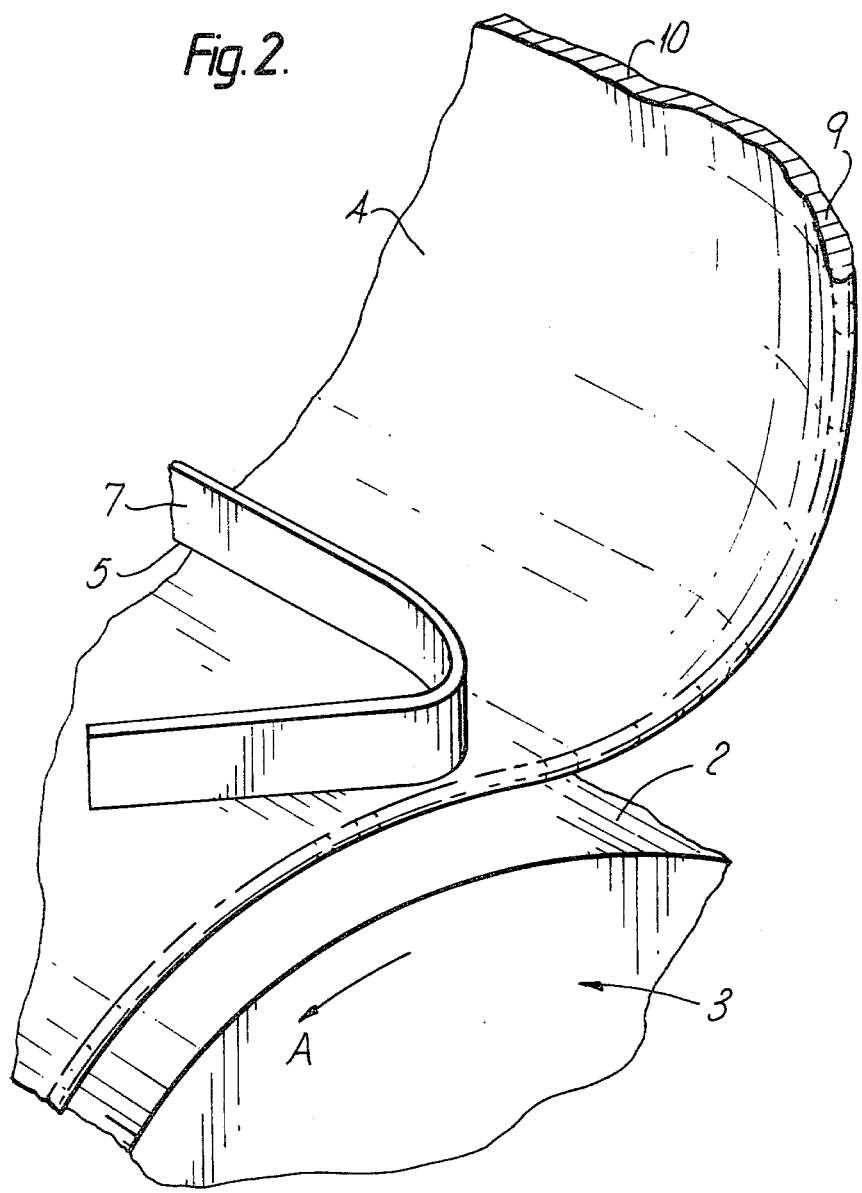
FIG. 2 is an enlarged view of part of the apparatus illustrated in FIG. 1.
Figure 3:
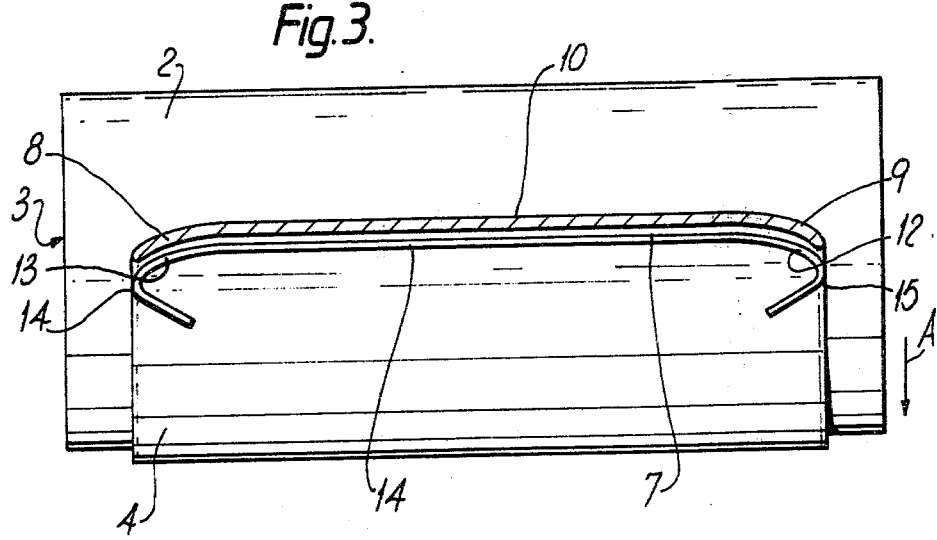
FIG. 3 is a plan view of the apparatus illustrated in FIG. 1.

The edge portions 8 and 9 of the film 4 have a transverse curvature, as illustrated in FIGS. 2 and 3, whilst the central portion 10 of the film has a substantially straight line cross-section. (The curved edge portions 8 and 9 are not illustrated in FIG. 1 for ease of illustration.) The edge portions 8 and 9 represent thickened margins or edge beads which are produced by the transverse melt tensions applied to the film edges by the high-speed extrusion and casting operation. The charge-emitting edge 5 of the blade electrode 7 is located at an optimum distance from the molten film at all positions across the width of the film to enable optimum pinning conditions to be applied across the entire film width. In particular, the charge-emitting edge 5 is supported in a curved configuration in the vicinity of the film edges such that the curved sections 12 and 13 conform closely to the transverse curvature or cross-section in the edge portions 8 and 9 of the film whilst the central section 14 of the blade edge conforms to the straight line cross section of the central portion 10 of the film. Extensions of the curved sections 12 and 13 are located inwardly of the edges of the film thereby avoiding any risk of a discharge to the parts of the casting surface 2 beyond the film edges. Connection to the voltage supply is provided via one of the extensions of the edge portions 12 and 13. It will be noted from FIG. 3 that the transverse extremities 14 and 15 of the blade electrode 7 are located in the vicinity of but not beyond the edges of the film 4, the actual transverse positioning of the extremities 14 and 15 with respect to the film edges being adjusted so as to avoid discharges between the electrode and the parts of exposed casting surface 2 beyond the edges of the film 4.

Figure 4:
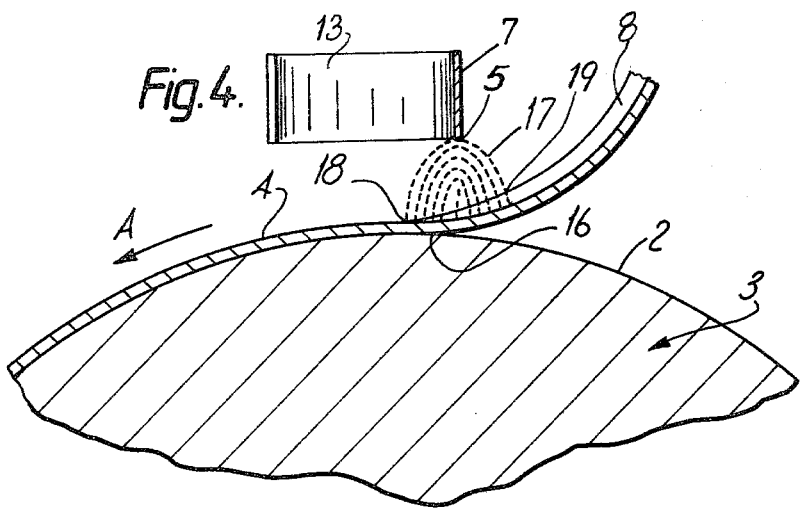
FIG. 4 is a partial cross-sectional view taken on the line IV—IV of FIG. 1.

As illustrated in FIG. 4, the charge-emitting edge 5 of the electrode 7 is positioned slightly in advance of the touchdown 16 of the film 4 upon the casting surface 2, i.e. the first contact of the moving film with the moving casting surface 2. Although not illustrated in the drawings, it will be appreciated that the edge 5 is similarly located with respect to the touchdown at all positions across the film width including in relation to the edge portions 8 and 9 of the film. FIG. 4 also illustrates the region of stable charge emission 17 issuing from the charge-emitting edge 5 from which a band of electrostatic charges within stable non-fluctuating boundaries 18 and 19 is deposited upon the film 4. A major proportion of the charges emitted in the region of stable emission 17 is deposited upon the film prior to the touchdown 16 of the film. The touchdown of the whole width of the film onto the casting surface 2 is located within the region defined by the stable non-fluctuating boundaries 18 and 19. The shortest paths between the charge-emitting edge 5 of the electrode 7 and the film 4 at the position on the film width represented by the cross-section in FIG. 4 are to the top surface of the film approximately at the boundary 19 and also just before the touchdown 16 and these represent the closest position of the charge-emitting edge 5 to the film 4. At other positions across the width of the film, the shortest path between the edge 5 and the film 4 does not exceed 115% of the shortest paths illustrated in FIG. 4.

FIGS. 5, 6 and 7 illustrate an electrode assembly of a form suitable for use in the apparatus illustrated in FIGS. 1 to 4 and comprising a blade electrode 21 of the nature described with reference to FIGS. 1 to 4, namely formed from a strip of non-corrosive steel approximately 1.25 cm wide and of uniform thickness of either 75 μm or 38 μm and having a charge emitting edge 22. The blade electrode 21 is supported by a carrier 23 comprising an electrically insulating block 24 which is resistant to the operational temperatures to which it is subjected and is formed from a reinforced epoxy resin. The block 24 is provided with bolt holes 25 for securing the electrode assembly to a supporting framework (not illustrated in the drawings). Two insulated electrode mounts 26 are slidably mounted in a track 20 formed in the insulating block 24. The electrode assembly is arranged during the extruding and quenching process in relation to the extruded film such that the film passes across the charge-emitting edge 22 in the direction of the arrow B in FIG. 5. The central section 27 of the blade electrode 21 is substantially linear and retained securely in a straight slot in the face of the insulating block 24 so as to conform to the substantially straight cross-section of the central portion of the film issuing from the extrusion die. The curved sections 28 and 29 of the blade electrode 21 correspond to the transverse curvature or cross-section in the edge portions of the film.

The curved sections 28 and 29 of the blade electrode 21 extend and are clamped into mounting blocks 30 and 31 respectively which are integral with the electrode mounts 26 by means of clamping bolts 33 and 34. Adjustment of the electrode assembly and in particular the curvature in the curved sections 28 and 29 of the blade electrode 21 in relation to the width and profile of the extruded film is achieved by sliding the mounts 26 along the track 20 and locking them in position by means of the locking bolts 36 and 37. The transverse extremities 38 and 39 of the blade electrode 21 are also arranged by such adjustment to be located just inside the edges of the film so that the possibility of discharge occurring between the electrode 21 and the parts of the casting surface beyond the edges of the film is avoided.

The blade electrode 21 is connected by means of a suitable cable (not shown in FIGS. 5 to 7) to the direct current voltage supply via the clamping bolt 33 which functions as an electrical terminal.

Figure 8:
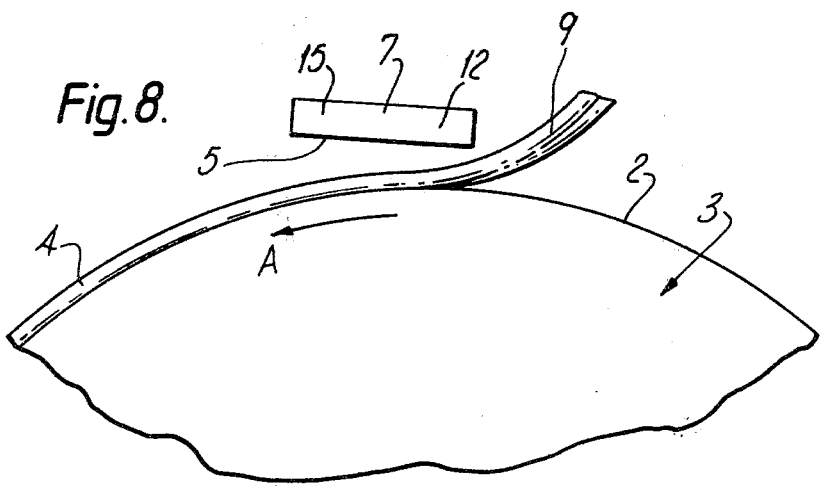
FIG. 8 is a partial end elevational view of a modified form of the apparatus illustrated in FIGS. 1 to 4.

FIG. 8 illustrates a modified form of the apparatus illustrated in FIGS. 1 to 4. Components common with FIGS. 1 to 4 are identified by common reference numerals. The blade electrode 7 illustrated in FIG. 8 is supported in the vicinity of the curved section 12 and the extremity 15 of the electrode such that the distance between the charge-emitting edge 5 and the upper surface of the film increases outwardly along the electrode 7 towards the extremity 15. This variation in distance causes the electrostatic field at the extremity 15 of the electrode to be less than that established by the central section 14 and the intervening curved section 12 of the electrode. The reduced electrostatic field at the extremity 15 of the electrode 7 avoids the risk of a discharge between the electrode and the parts of the casting surface 2 beyond the film edges.

The invention is further illustrated by the following examples and comparative examples.

EXAMPLES 1 TO 13 AND COMPARATIVE EXAMPLES 1 TO 9

Using the apparatus described with reference to and illustrated in FIGS. 1 to 7, a number of tests were conducted, as Examples 1 to 13, with varying conditions of casting surface speed, blade electrode voltage and current as indicated in the Table. The spacing between the charge-emitting edge of the blade electrode and the upper surface of the film (shortest path) at all positions across the width of the film was in the range 4 to 5 mm. The surface voltage and charge density on the film deposited upon the casting surface are also recorded in the Table. The surface voltage was measured by means of an electrometer field meter and the charge density ($\sigma$) determined from the equation:

$$\sigma = \frac{I}{ws}$$

in which I represents the electrode current in amperes, w the width of the film in meters and s the speed of the casting surface in meters/second.

In all of the Examples 1 to 13 the molten film was firmly pinned across its whole width to the casting surface and the resulting film after stripping from the surface was found to be of excellent quality with no major surface defects. The films of Examples 12 and 13 were subjected to a conventional process of biaxial orientation and heat setting by stretching in sequence in the longitudinal and transverse directions 3.5 times its original dimensions at about 90° C. and heat setting especially in the regions of the curved edge portions of the film. The bubble defects were replicated into the surface of the quenched film.

TABLE

| Example No. | Peripheral speed of casting surface m/min | Blade electrode thickness μm | Electrode kV | Electrode Current mA | Charge density on film nC/cm$^2$ | Surface voltage on film kV |
|---|---|---|---|---|---|---|
| 1 | 61 | 75 | 8.0 | 1.2 | 570 | 1.19 |
| 2 | 78 | 75 | 8.0 | 1.6 | 600 | 1.02 |
| 3 | 91 | 75 | 8.0 | 2.1 | 665 | 0.98 |
| 4 | 107 | 75 | 8.0 | 2.4 | 650 | 0.78 |
| 5 | 61 | 75 | 8.0 | 1.4 | 565 | 1.2 |
| 6 | 76 | 75 | 8.5 | 2.0 | 655 | 1.1 |
| 7 | 91 | 75 | 8.5 | 2.4 | 665 | 1.0 |
| 8 | 107 | 75 | 9.0 | 3.25 | 785 | 1.1 |
| 9 | 91 | 38 | 7.0 | 2.6 | 720 | — |
| 10 | 125 | 38 | 8.0 | 3.4 | 730 | — |
| 11 | 138 | 38 | 7.5 | 4.0 | 765 | — |
| 12 | 50 | 38 | 7.4 | 1.8 | 236 | — |
| 13 | 81 | 38 | 7.4 | 5.9 | 478 | — |
| Comparative 1 | 46 | wire diameter 175 μm | 5.5 | 0.8 | 425 | 0.95 |
| Comparative 2 | 61 | wire diameter 175 μm | 5.5 | 1.1 | 440 | 0.75 |
| Comparative 3 | 76 | wire diameter 175 μm | 6.0 | 1.7 | 545 | — |
| Comparative 4 | 91 | wire diameter 175 μm | 6.5 | 1.8 | 480 | 0.68 |
| Comparative 5 | 107 | wire diameter 175 μm | 6.5 | 1.7 | 390 | 0.44 |
| Comparative 6 | 107 | wire diameter 175 μm | 7.0 | 2.2 | 505 | 0.58 |
| Comparative 7 | 114 | wire diameter 175 μm | 7.0 | 1.7 | 365 | 0.41 |
| Comparative 8 | 126 | wire diameter 175 μm | 7.0 | 1.3 | 250 | 0.41 |
| Comparative 9 | 76 | 75 | 8.0 | 2.0 | 630 | — | under dimensional restraint at about 220° C. without splitting or any other process difficulties. The resulting films were of excellent quality and exhibited no major surface defects.

Similar tests were conducted with a conventional pinning wire electrode having a diameter of 175 μm held under tension in a substantially straight line across the width of the film. The conditions of pinning and the charge density and surface voltage are also recorded in the Table as Comparative Examples 1 to 8. In each case the film was adequately pinned and quenched. At the slowest casting speed employed in Comparative Example 1, 46 m/minute, the surface quality of the film was good and no major bubble defects were discernable. However, with increased casting speed surface ripple and defects resulting from bubble entrainment between the film and the casting surface were introduced and became more severe with the faster casting speeds. In Comparative Example 2 a slight bulb haze was noted whilst in Comparative Example 3 transverse bubble bars were additionally noted in the edge portions of the film and these defects increased in severity through Comparative Examples 3 to 8.

Comparative Example 9 was conducted with an electrode blade supported in tension in a rectilinear state but otherwise of the nature used in Examples 1 to 8. Bubbles were entrained between the film and the casting surface

I claim:

1. An apparatus for extruding and quenching a thermoplastics film, which comprises a movable casting surface arranged to receive a web of continuously-extruded thermoplastics film, an electrostatic pinning electrode supported transversely across and in spaced relation to the path of the molten film in the proximity of or prior to the region of first contact of the film with the casting surface, said electrostatic pinning electrode comprising a blade having a charge-emitting edge which is non-linear and conforms during extrusion and quenching substantially at least to the transverse curvature of the marginal portion of the film adjacent each of the film edges in said proximity of or prior to the region of first contact of the film with the casting surface.

2. An apparatus according to claim 1, in which the charge-emitting edge of the blade electrode is arranged to be so located with respect to the curved marginal portions of the film that said marginal portions are within the region of electrostatic charges emitted by the blade electrode which is defined by stable non-fluctuating charge boundaries.

3. An apparatus according to claim 2, in which the blade electrode is arranged in relation to the extruded film so that the whole width of the film falls inside the region of stable non-fluctuating charge boundaries.

4. An apparatus according to claim 1, in which the distance between the charge-emitting edge of the blade electrode and the film (measured along the shortest path between the film and said edge) at any position along the charge-emitting edge does not exceed 125% of the distance between the film and the charge-emitting edge at the position along the edge which is closest to the film.

5. An apparatus according to claim 1, in which the distance between the charge-emitting edge of the blade electrode and the film (measured along the shortest path between the film and said edge) increases progressively towards and in the vicinity of the edges of the film.

6. An apparatus according to claim 1, in which the charge-emitting edge of the blade electrode has a width up to 500 μm.

7. An apparatus according to claim 1, in which the end sections of the blade electrode do not extend beyond the film edges and are curved in the vicinity of the marginal portions of the film and towards the central portion of the film.

8. A process for extruding and quenching a thermoplastics film, which comprises continuously extruding a molten thermoplastics film onto a moving casting surface, depositing electrostatic charges upon the molten film by means of an electrostatic pinning electrode supported transversely across and in spaced relation to the molten film in the proximity of or prior to the region of first contact of the film with the casting surface, said electrostatic pinning electrode comprising a blade having a charge-emitting edge, which is non-linear and conforms during extrusion and quenching substantially at least to the transverse curvature of the marginal portion of the film adjacent each of the film edges in said proximity of or prior to the region of first contact of the film with the casting surface.

9. A process according to claim 8, in which the charge-emitting edge of the blade electrode is located with respect to the curved marginal portions of the film that said marginal portions are within the region of electrostatic charges emitted by the blade electrode which is defined by stable non-fluctuating charge boundaries.

10. A process according to claim 9, in which the blade electrode is arranged in relation to the extruded film so that the whole width of the film falls inside the region of stable non-fluctuating charge boundaries.

11. A process according to claim 8, in which the distance between the charge-emitting edge of the blade electrode and the film (measured along the shortest path between the film and said edge) at any position along the charge-emitting edge does not exceed 125% of the distance between the film and the charge-emitting edge at the position along the edge which is closest to the film.

12. A process according to claim 8, in which the distance between the charge-emitting edge of the blade electrode and the film (measured along the shortest path between the film and said edge) increases progressively towards and in the vicinity of the edges of the film.

13. A process according to claim 8, in which the edge of the blade electrode has a width up to 500 μm.

14. A process according to claim 8, in which the end sections of the blade electrode do not extend beyond the film edges and are curved in the vicinity of the marginal portions of the film and towards the central portion of the film.

* * * * *